Apr. 17, 1923.

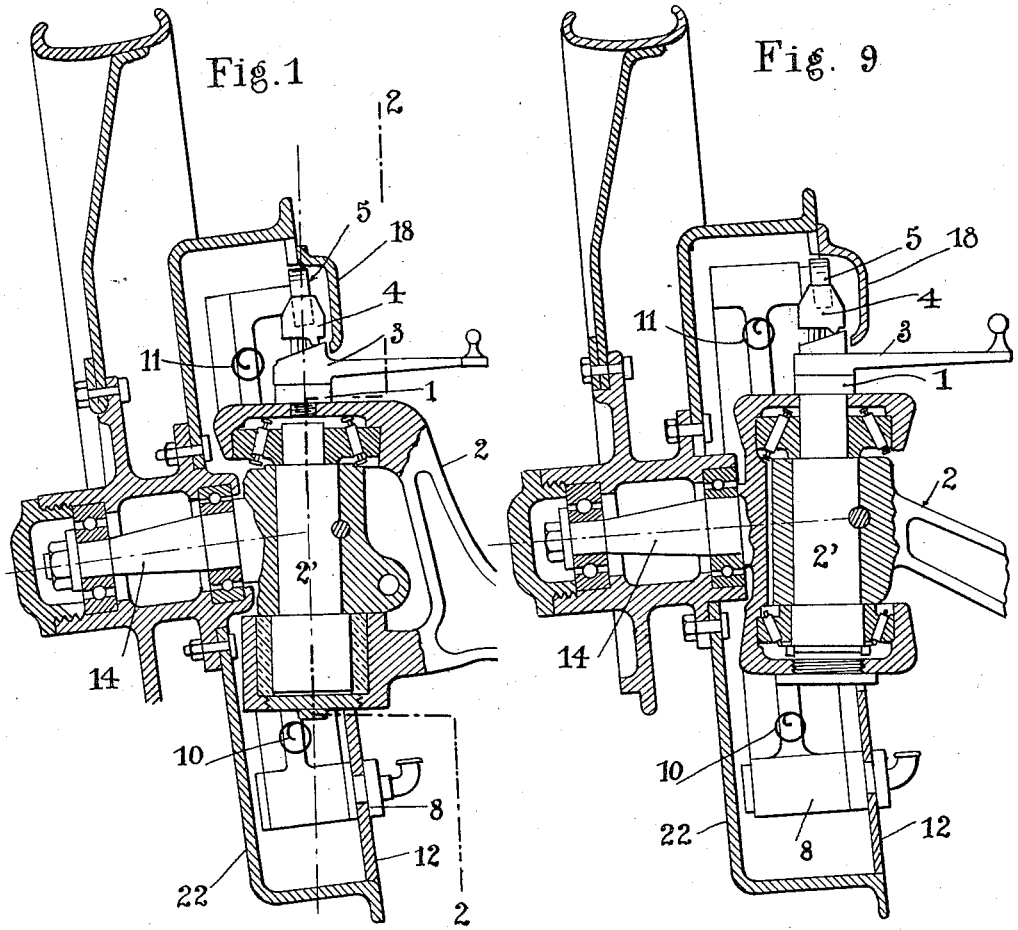
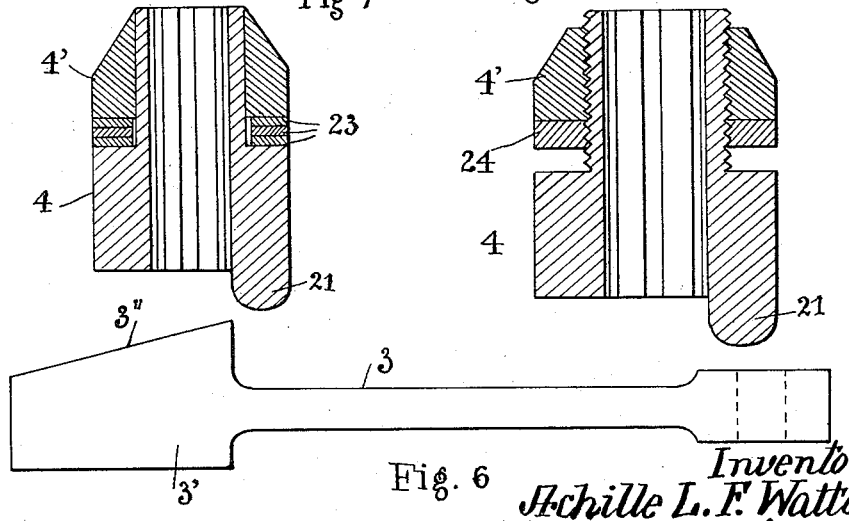

A. L. F. WATTEL

BRAKE MECHANISM FOR AUTOMOBILES

Filed Aug. 24, 1921

Inventor
Achille L. F. Wattel
by Wilkinson & Giusta
Attorneys.

Patented Apr. 17, 1923.

1,452,402

UNITED STATES PATENT OFFICE.

ACHILLE LÉON FRANÇOIS WATTEL, OF SEVRES, FRANCE.

BRAKE MECHANISM FOR AUTOMOBILES.

Application filed August 24, 1921. Serial No. 494,879.

*To all whom it may concern:*

Be it known that I, ACHILLE LÉON FRANÇOIS WATTEL, citizen of the Republic of France, residing at 22 Avenue de Bellevue, Sevres, Seine and Oise, France, have invented new and useful Improvements in Brake Mechanisms for Automobiles (for which a patent has been granted in France dated August 2, 1920, Number 521,684), of which the following is a specification.

The present invention relates to a device for actuating a brake which acts upon the steering wheels of an automobile, this actuation being independent of the direction of the wheels.

The invention comprises essentially a cam-lever mounted on a shaft fitted on the axle in the prolongation of the pivot trunnion of the wheel. This lever actuates a cone sliding upon this shaft, the rising and falling movement of the cone acting by means of rolls on the segments of the brake for the purpose of clamping or releasing them.

The invention is shown by way of example in the accompanying diagrammatic drawing, in which:

Fig. 1 is a vertical section through the axle-arm and pivot-bolt of the wheel.

Fig. 6 is an elevation of the cam-lever.

Fig. 7 is an adjusting device for taking up the wear of the brakes.

Fig. 8 is another arrangement of adjusting device.

Fig. 9 is a view similar to Fig. 1 and showing the invention applied to a wheel of an axle having a movable fork.

Figure 2:
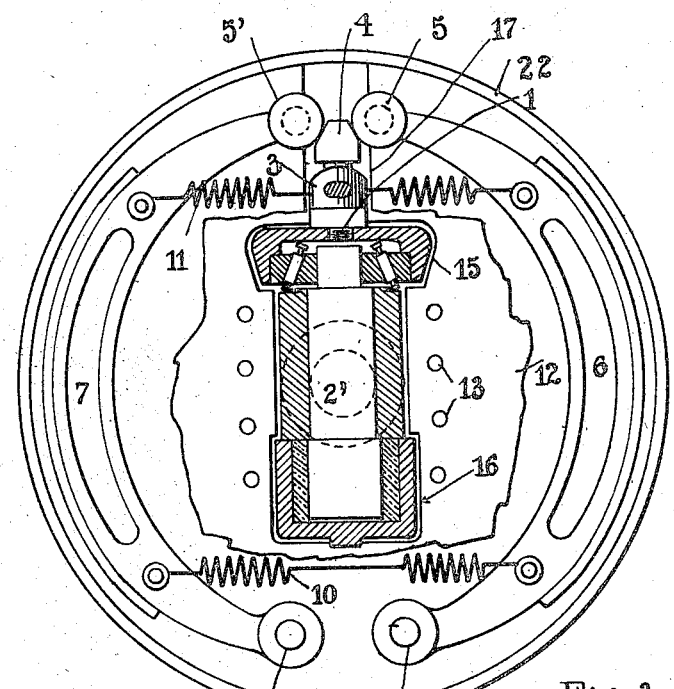
Fig. 2 is a partial section along line 2—2 of Fig. 1.

1 represents the supporting shaft for the cone and cam-lever; it is concentric with the pivot-pin 2' and is fixed on the stationary fork of the axle 2. The cam-lever 3 actuates the cam-cone 4 which latter is in contact with the rolls 5 and 5' mounted on the brake-blocks 6 and 7. These latter are pivoted on shafts 8 and 9 and are urged towards each other by springs 10 and 11. Shafts 8 and 9 are fixed to a cheek 12 riveted at 13 upon lugs 14' integral with the axle-arm 14. This cheek is cut out at 15 and 16 to give passage to the fixed jaws of the axle 2 and at 17 for the passage for the cone which actuates the brake-blocks. A demountable casing 18 encloses the rolls 5 and 5' as well as the cone 4.

The shaft-support 1 has ribs 19 which correspond to grooves 20 upon the cone. At the lower portion of the cone a boss 21 is in contact with the cam-lever 3. A drum 22 fixed to the hub of the wheel receives the pressure of the blocks 6 and 7 for braking.

The cone 4 may be constructed as shown in Fig. 7, in which packing pieces, consisting of washers, permit of varying the cone for purposes of adjustment. As will be seen, the cone consists of two portions (4, 4') which can slide one upon the other, one of which carries the cone properly speaking while the other carries the heel 21 in contact with the cam-lever.

The cone 4 may also be constructed as shown in Fig. 8. In this case the cone properly speaking, can be screwed onto a screwed nipple of the lower portion which carries the heel 21. A lock-nut 24 assures locking, though any other stop-means could be provided.

The cam-lever 3 (Fig. 6) has a hub 3' engaging the shaft 1, and the upper portion of this hub has an incline or cam 3" which acts upon the heel 21 (Figs. 1 and 9).

The method of operation is as follows:

By acting by any suitable means; rod, cable or the like, upon the cam-lever, the boss 21 follows the incline of the cam-lever 3 and as the cone 4 cannot turn, being held by the ribs 19 and grooves 20, it moves along the shaft 1 and moves the rolls 5 and 5' apart and applies the brake-blocks against the brake-drum. As soon as the action upon the lever ceases, the springs 10 and 11 remove the segments 6 and 7 from the drum 22 and braking action ceases.

Adjustment of the brake in order to take up wear of the segments 6 and 7 or of their mountings is effected.

1. Either by moving the cone 4 by one notch upon the shaft 1 so that the boss 21 comes, at the position of rest of the brake upon a more raised portion of the incline of the cam-lever 3.

2. Or by varying the thickness of the part 23 so as to increase the length of the conical piece 4, 4'.

3. Or by lengthening, by means of the screw-threads, the conical piece 4, 4' and locking it in the desired position.

This adjustment is made after removal of the casing 18.

Constant contact between the cam-lever, cone and the rolls is assured by the action of the springs 10 and 11.

The direction of the wheel has no effect upon the brake-blocks 6 and 7, the axis of the cone passes through the axis of the pivot pin 2' of the wheel and the point of contact of the rolls with the cone slides upon a circle of the cone.

The brake-actuating device can be constructed with an axle having a movable fork and the shaft 1 would then be fixed to the axis of pivoting or would be formed by a prolongation of this axis. This arrangement is shown in Fig. 2.

Figure 10:
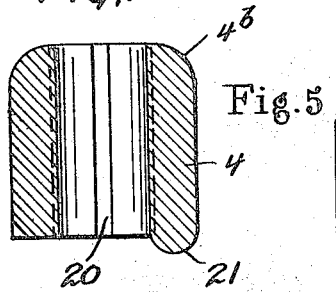
Fig. 10 is an axial section through a modified form of the actuating cone.
Figure 5:
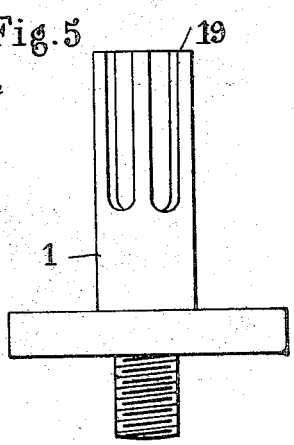
Fig. 5 is an elevation of the supporting shaft for the cone and the cam-lever.
Figure 3:
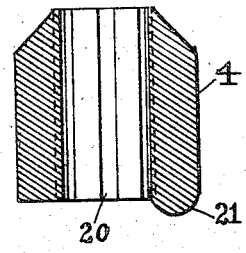
Fig. 3 is an axial section through the actuating cone for the segments.
Figure 4:
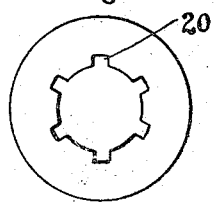
Fig. 4 is a plan thereof.

The conical portion of the part 4 may be replaced by a spherical portion 4$^b$, shown in Figure 10, or by any other part having the form of a solid of revolution the generatrix of which (as at 4$^b$ in Figure 10) would be determined by the law according to which it is desired to effect braking.

The invention has been described merely by way of an example and in no way limitatively and it is obvious that modifications in details may be made therein without departing from the spirit of the invention.

I claim:

1. Braking device for steering-wheels of automobiles, comprising in combination pivot pins for said wheels a brake-drum on each of said steering wheels, brake blocks carried in operative relation to the drum, a shaft fixed to the axle in the prolongation of the pivot pin of each of said wheels, a cone slidably but non-revolubly mounted on said shaft, a cam-lever mounted on said shaft, means for rotating said cam-lever to raise or lower said cone and means for transmitting the motion of said cone to the brake-blocks.

2. Braking device for steering-wheels of automobiles, comprising in combination pivot pins for said wheels a brake-drum on each of said steering-wheels, brake-blocks carried in operative relation to the drum, a shaft fixed to the axle in the prolongation of the pivot-pin of each of said wheels, a cone slidably but non-revolubly mounted on said shaft, a cam-lever mounted on said shaft, means for rotating said cam-lever to raise or lower said cone and rolls engaging said cone and said brake-blocks and adapted to transmit the motion of the cone to said brake-blocks.

3. Braking device for steering wheels of automobiles, comprising in combination pivot pins for said wheels a brake-drum on each of said steering wheels, brake-blocks carried in operative relation to the drum, a shaft fixed to the axle in the prolongation of the pivot pin of each of said wheels, a cone slidably but non-revolubly mounted on said shaft, the surface of said cone being generated according to the nature of the braking action required, a cam-lever mounted on said shaft and engaging said cone, means for rotating said cam lever to raise or lower said cone and means for transmitting the motion of said cone to said brake-blocks.

4. Braking device for the steering-wheels of automobiles, comprising in combination pivot pins for said wheels a brake-drum on each of said steering-wheels, brake blocks carried in operative relation to the drum, a shaft fixed to the axle in the prolongation of the pivot pin of each of said wheels, a cone slidably but non-revolubly mounted on said shaft, a cam-lever mounted on said shaft, means for rotating said cam-lever to raise or lower said cone, means for transmitting the motion of said cone to said brake-blocks and means for adjusting the position of said cone relative to the incline of said cam.

ACHILLE LÉON FRANÇOIS WATTEL.